US012771834B2

(12) United States Patent
Bourdev et al.

(10) Patent No.: US 12,771,834 B2
(45) Date of Patent: Oct. 20, 2026

(54) SYSTEM FOR TRAINING AND DEPLOYING FILTERS FOR ENCODING AND DECODING

(71) Applicant: WaveOne Inc., Mountain View, CA (US)

(72) Inventors: Lubomir Bourdev, Mountain View, CA (US); Alexander G. Anderson, Mountain View, CA (US); Kedar Tatwawadi, Mountain View, CA (US); Sanjay Nair, Fremont, CA (US); Craig Lytle, Los Altos Hills, CA (US); Hervé Guihot, Mountain View, CA (US); Brandon Sprague, Pacifica, CA (US); Oren Rippel, Mountain View, CA (US)

(73) Assignee: WAVEONE INC., Palo Alto, CA (US)

( * ) Notice: Subject to any disclaimer, the term of this patent is extended or adjusted under 35 U.S.C. 154(b) by 123 days.

(21) Appl. No.: 18/425,405

(22) Filed: Jan. 29, 2024

(65) Prior Publication Data

US 2024/0171737 A1 May 23, 2024

Related U.S. Application Data

(63) Continuation of application No. 17/374,826, filed on Jul. 13, 2021, now Pat. No. 11,917,142.

(51) Int. Cl.

| | |
|---|---|
| ***H04N 19/42*** | (2014.01) |
| ***G06N 3/04*** | (2023.01) |
| ***G06N 20/00*** | (2019.01) |
| ***H04N 19/117*** | (2014.01) |

(52) U.S. Cl.

CPC ............ *H04N 19/117* (2014.11); *G06N 3/04* (2013.01); *G06N 20/00* (2019.01); *H04N 19/42* (2014.11)

(58) Field of Classification Search

None

See application file for complete search history.

(56) References Cited

U.S. PATENT DOCUMENTS

2015/0358662 A1 * 12/2015 Drouin .............. H04N 21/2225 725/97
2020/0053408 A1 * 2/2020 Park .................... H04N 19/172

* cited by examiner

*Primary Examiner* — Samuel D Fereja

(74) *Attorney, Agent, or Firm* — BakerHostetler

(57) ABSTRACT

A cloud service system manages a filter repository including filters for encoding and decoding media content (e.g. text, image, audio, video, etc.). The cloud service system may receive a request from a client device to provide a filter for installation on a node such as an endpoint device (e.g. pipeline node). The request includes information such as a type of bitstream to be processed by the requested filter. The request may further include other information such as hardware configuration and functionality attribute. The cloud service system may access the filter repository that stores the plurality of filters including encoder filters and decoder filters and may select a filter that is configured to process the type of bitstream identified in the request and provide the selected filter to the client device.

22 Claims, 5 Drawing Sheets

100

100

Filter Repository
140

| Type | Filter ID | Bitstream Compatibility | Node Compatibility | Functionality |
|---|---|---|---|---|
| Encoder | E1 | Input: I1 Output: S1, S2 | Node 1, 3 | Video Enhancement |
| Encoder | E2 | Input: I2 Output: S3 | Node 2 | Translate |
| Decoder | D1 | Input: S1 Output: O1 | Node 1 | Night Vision Enhancement |
| Decoder | D2 | Input: S2 Output: O2 | Node 3 | Color Enhancement |
| Decoder | D3 | Input: S3 Output: O3 | Node 2 | Translate |

FIG. 2

SYSTEM FOR TRAINING AND DEPLOYING FILTERS FOR ENCODING AND DECODING

CROSS REFERENCE TO RELATED APPLICATIONS

This application is a Continuation Application of U.S. patent application Ser. No. 17/374,826, filed Jul. 13, 2021, the disclosures of which are incorporated by reference in their entirety.

BACKGROUND

This invention generally relates to encoding and decoding content, and more specifically to encoding and decoding content using machine-learned video encoding filters and decoding filters.

Various online systems transmit information to and from one another over a network. The information may be, for example, content such as an image or video, or a string of text such as an e-mail or word document. A sender encodes the information into a compressed code such that the compressed code can be efficiently transmitted to the receiver. The compressed code may be referred to as a bitstream. The receiver can then decode the bitstream to reconstruct the original information.

Existing approaches for encoding and decoding content, such as videos, are often based on pre-defined algorithms that specify details regarding how a video is compressed and how a video can be decompressed in a reconstruction process. The pre-defined algorithms are often hard-coded in hardware at compression or decompression user endpoints, and as a result, a user endpoint may be limited to the pre-defined algorithm that is built in the hardware configuration.

SUMMARY

The methods and systems disclosed herein describe a cloud service system that manages a filter repository including filters for encoding and decoding content (e.g. text, image, audio, video, etc.). The cloud service system may receive a request from a client device to provide a filter for installation on a node such as an endpoint device (e.g. pipeline node). The request includes information such as a type of bitstream to be processed by the requested filter. The request may further include other information such as hardware configuration and functionality attributes. The cloud service system may access the filter repository that stores the plurality of filters including encoder filters (or encoder) and decoder filters (or decoder), and may select a filter that is configured to process the type of bitstream identified in the request and provide the selected filter to the client device.

In one embodiment, the filters are trained by a machine learning process and are coupled to receive an input bitstream and generate an output bitstream. Each filter is associated with a bitstream compatibility attribute which identifies a subset of bitstream types that are compatible with the filter. For example, a filter may only accept certain types of bitstreams and based on the type of bitstream included in the request, the system may select a filter based on the bitstream and other information associated with the request. In one embodiment, a decoder filter is trained in conjunction with an encoder filter. The pair of encoder and decoder filters may be referred to as a pair of compatible filters and the decoder filter may be referred to as a paired (or compatible) decoder filter for the encoder filter (or vice versa). The pair of encoder and decoder is trained together such that the decoder is configured to process the type of bitstream outputted from the encoder.

The encoder and decoder filters are filters that are different from traditional encoders or decoders which are hard-coded in hardware specification on user devices. As a result, the filters make it possible for the deployment process of the encoder/decoder filters to be processed by hardware accelerators or CPUs (central processing units) that are commonly installed on devices such as computers, cameras, and phones. Although different neural network architectures may be implemented by different algorithms, the different algorithms may include similar computing blocks such as matrix multiplications. As a result, the different neural network algorithms may be computed by common hardware accelerators or CPUs (or partially on CPUs) that are available on endpoint devices and the endpoint users may be exposed to more flexible and versatile options to decode the received content.

In one embodiment, each filter may be additionally associated with a functionality attribute. Specifically, a pair of encoder and decoder together may be trained to achieve a specific functionality. For example, a decoder may be trained in conjunction with an encoder, where the encoder generates a bitstream based on a raw video and the decoder takes the bitstream as input and outputs semantic contents such as recognition of abnormal activities from a security camera footage. As another example, a filter may be configured to take a low-resolution video as input and outputs a high-resolution video. As yet another example, a filter may take a video/image as input and outputs a video/image with annotations for objects (e.g. people, cars, trees) in the video/image. That is, in some embodiments, the encoder filter may generate compressed representations of targeted features desired in a reconstructed content item, rather than information for an accurate reconstruction of the original content item.

The disclosed methods and systems provide various advantageous technical features. For example, the disclosed method may process content to achieve various effects by providing end users various filters (e.g. encoders and decoders) that are associated with various functionality attributes. Furthermore, while it may be challenging for existing approaches to change the encoding/decoding algorithms for hard-coded configurations, the methods and systems disclosed herein provide flexible and versatile options to users regarding how to process content. Specifically, the cloud services system provides a way to install various filters at user endpoints without replacing or changing hardware configuration at user endpoints.

BRIEF DESCRIPTION OF THE DRAWINGS

FIG. 2 illustrates an exemplary data structure for the filter repository, in accordance with an embodiment.

Figure 1:
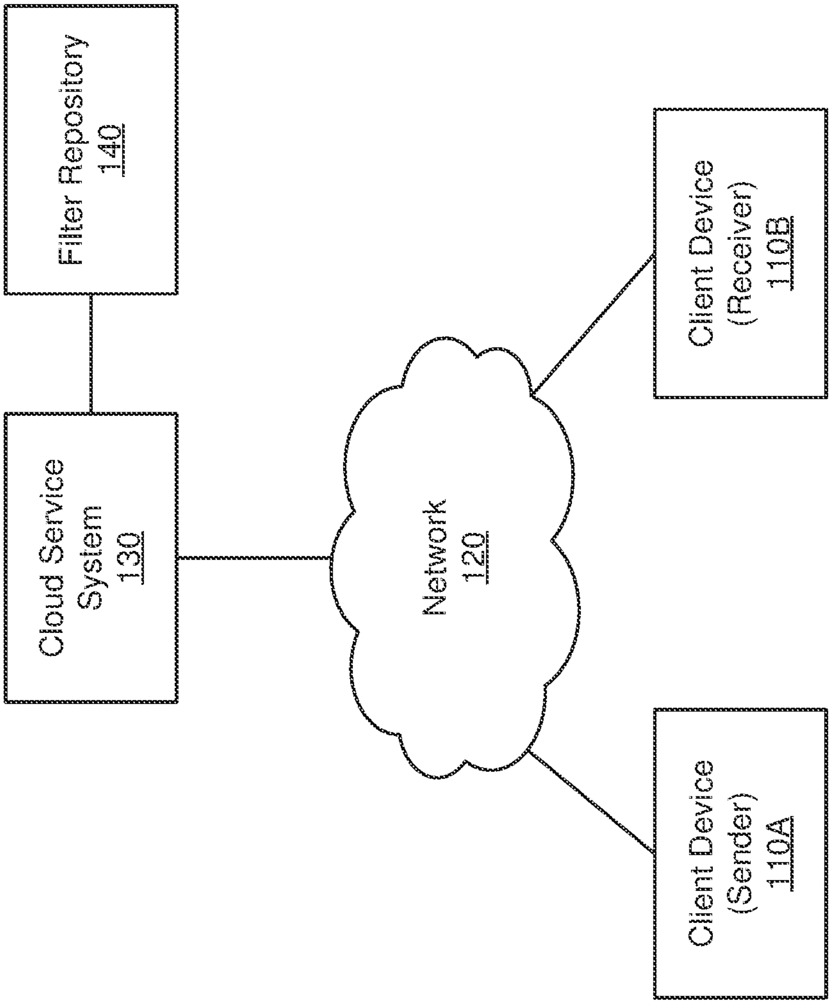
FIG. 1 is a block diagram of a system environment including a cloud service system and a filter repository, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1 is a block diagram of a system environment 100 including a cloud service system 130 connected with a filter repository 140, in accordance with an embodiment. The system environment 100 shown in FIG. 1 comprises a cloud service system 130, a filter repository 140, a client device 110A (may be referred to as a sender client), a client device 110B (may be referred to as a receiver client), and a network 120. Client devices 110A and client 110B may be collectively referred to as client devices 110. In alternative configurations, different and/or additional components may be included in the system environment 100.

The cloud service system 130 manages the filter repository 140 including encoder and decoder filters for encoding and decoding content (e.g., text, image, audio, video, etc.). The cloud service system 130 may train the filters and deploy them to client devices 110 based on requests received from client 110. The filter training and filter selecting processes associated with the cloud service system 130 are discussed in further detail below.

In one embodiment, the filters stored in the filter repository 140 are software-based filters in which at least a part of the algorithms for performing the encoding or decoding process can be changed via a software update process and are not hard-coded. In one embodiment, the filters stored in the filter repository 140 are machine-learned filters each including a model trained and deployed by a machine learning process. In one instance, the filters are configured as neural network filters that each include at least one component configured as a neural network model associated with a set of parameters. The cloud service system 130 may generate different architectures of filters, and train the set of parameters for each filter through a machine learning process for neural network models. Examples of neural network models include but are not limited to artificial neural networks (ANN), convolutional neural networks (CNN), deep neural networks (DNN), recurrent neural networks (RNN), long short-term memory (LSTM) networks, spiking neural networks (SNN), transformer networks, and the like.

For the sake of explanation, the filters managed by the cloud service system 130 are primarily described with respect to machine-learned filters for the remainder of the specification. However, it is appreciated that the filters can be any type of structure where the configuration of the filters can be updated, or otherwise changed via a software update process, for example, in conjunction with a cloud service system 130. For example, the filters may be configured in programming languages such as JavaScript or an assembly-level block with or without a machine-learned component.

A trained encoder filter is coupled to receive an input stream of information and output an output stream that, for example, encodes the data in the input stream to compressed code. For example, a trained encoder filter may be used by the sender client 110A to encode information, such as a video, into compressed code, and the compressed code may be transmitted to the receiver client 110B. A trained decoder filter is coupled to receive an input stream, for example, a compressed code generated by an encoder filter, and generate an output stream that can be used to reconstruct the original information compressed in the code, potentially with some functional operations. For example, a trained decoder filter may be used by the receiver client 110B to decode information in compressed code received from the sender client 110A and reconstruct the original information, for example, the video.

In one embodiment, the cloud service system 130 trains one or more encoder filters in conjunction with one or more decoder filters. A pair of encoder and decoder filters trained in conjunction with each other may be referred to as a pair of compatible filters and the decoder filter may be referred to as a paired (or compatible) decoder filter for the encoder filter (or vice versa). The pair of encoder and decoder is trained together such that the decoder is configured to process output streams outputted from the encoder filter to reconstruct information compressed in the output stream to achieve a certain functionality, such as generating a high-resolution variant or obscuring objects in a video. Further detail regarding functionalities of filters are discussed further below in accordance with FIG. 2.

The filters may be trained by one or more of the neural network models using training contents such as training videos or training images as training data, where training contents may include original contents and desired versions of the original contents that are already known. For example, the training data for training a filter that outputs videos with higher frame rate may include a set of original videos and a set of videos corresponding to the original videos with higher frame rates. The set of videos with higher frame rates may be used in calculating an error term which represents the difference between the output from the model and the desired output. The error term may then be used as a reference to update parameters associated with the model such that the errors in subsequent iterations may decrease. Further detail regarding the training process of encoder and decoder filters is discussed in accordance with FIG. 4.

In one primary example referred throughout the remainder of the specification, the content to be encoded and decoded may be a video that includes a sequence of frames. The sequence of frames are typically images of the same dimensionality, and capture motions that occur within a scene over time due to movement of the camera or the movement of the objects themselves. Specifically, motions are animated as the positions of pixels that correspond to a particular portion of the scene change throughout the sequence of frames. For example, the movement of a pedestrian walking in the left direction may be animated as the position of the pedestrian gradually shifts toward the left side of the frames. However, it is also appreciated that in other embodiments, the information can be data other than videos, such as a sequence of texts in a document or a sequence of data representing an audio, as well as any other types of information.

In general, video frames, or other types of data derived from video frames may be represented as a tensor which is an abstracted representation of the content. As defined herein, a tensor denotes a multi-dimensional array of values having a width, height, and one or more channels across the depth of the tensor. Therefore, a video frame in RGB color may be represented as a tensor with three channels, each channel including pixel intensity values for a respective color. As another example, a video frame in grayscale may be represented as a tensor with one channel representing pixel intensity values in grayscale. As defined herein, a "position" of an element or pixel in a tensor denotes the position within the width and height of the tensor. Thus, an element at a particular position of a tensor may have a set of values associated with the element that corresponds to the number of channels of the tensor.

In one embodiment, a filter in the filter repository 140 is associated with a bitstream compatibility attribute that identifies a subset of bitstream types that are compatible with the filter. The filters in the filter repository 140 process a plurality of bitstream types. Specifically, certain bitstreams are human interpretable, such as images, videos, text, bounding boxes, while certain bitstreams are compressed representations that are learned during the training process, such as an output stream from a particular encoder filter. Bitstream types may differ with each other with respect to the type of information a bitstream includes (e.g., video, images, audio, text, bounding boxes in an image), and the format the information is represented by that may differ according to the entity using the filter (e.g., different video streaming services), how the information is characterized in the input stream and output stream, and the like. For example, a bitstream type associated with one entity may use one-hot encoding to represent text, while a bitstream type associated with another entity may use word embeddings to represent text. As another example, an encoder-decoder filter for reconstructing video content may use only the pixel data of a target frame ("I-frame encoding") to encode the video, and the bitstream types for the input and output streams may encode and decode the pixel data of the target frame, while another encoder-decoder filter may characterize a target frame with respect to flow and residual information, and the bitstream types for the input and output streams of such an encoder-decoder filter may encode and decode the flow and residual information of the target frame.

Depending on the architecture, a filter may accept certain types of input streams and output certain types of output streams specified in the bitstream compatibility attribute for the filter. For example, an encoder filter may be coupled to receive input streams of a bitstream type that are in the form of a JPEG image and generate output streams of a bitstream type that are compressed representations of the image. As another example, an encoder filter may be coupled to receive input streams that are in the form of ASCII text and generate output streams that are compressed representations of the text. As yet another example, a decoder filter may be coupled to receive input streams of a bitstream type that correspond to the output streams generated by one or more encoder filters trained in conjunction with the encoder filter.

In one instance, each of the different bitstream types that characterize the input streams and output streams for a particular filter are each assigned a unique bitstream identifier (bitstream ID). In such an embodiment, the bitstream compatibility attribute for a filter may specify the respective subset of bitstream ID's that the filter is configured to process as an input stream or generate as an output stream. For example, an input stream type to an encoder filter including textual information in ASCII code may have a bitstream ID of "A020388," where the symbol "A" represents ASCII code.

In one embodiment, a filter in the filter repository 140 is associated with a node compatibility attribute that identifies a subset of node types that are compatible with the filter. Specifically, a node may be a compression endpoint such as a computer, a TV, a camera, a security camera, a phone or any electronic devices that a filter can be installed on to encode or decode information. Each node (e.g., smartphones or cameras with different operating systems) may be associated with hardware configurations such as display devices, memory, and computing power. Thus, depending on the specifications of the hardware of the node, certain filters may be installed on the node depending on, for example, memory size to store a filter, or the processing power required to use the filter. The node compatibility attribute for a filter thus specifies the types of nodes the filter can be deployed on depending on the hardware configuration associated with the node.

In one instance, each of the different node types that a filter can be deployed on is assigned a unique node identifier (node ID). In such an embodiment, the node compatibility attribute for a filter may specify the respective subset of node ID's that the filter is configured to be deployed on.

In one embodiment, a filter in the filter repository 140 is associated with a functionality attribute that specifies one or more operations that a filter performs on the content to be processed (e.g., image, video, text, audio). The one or more operations may include reconstructing the original content encoded by an encoder filter or synthesizing different versions of the original content that include desired features. For example, for a video, a decoder filter may receive compressed code for the video from an encoder filter and generate a upsampled version of the video. As another example, for an English phrase, a decoder filter may receive compressed code for the text and generate a translated version of the phrase in French. More examples of different operations are provided in detail in conjunction with FIG. 2. The functionality attribute for a filter thus may indicate the type of functionality a filter is configured to perform on encoded content.

Figure 4:
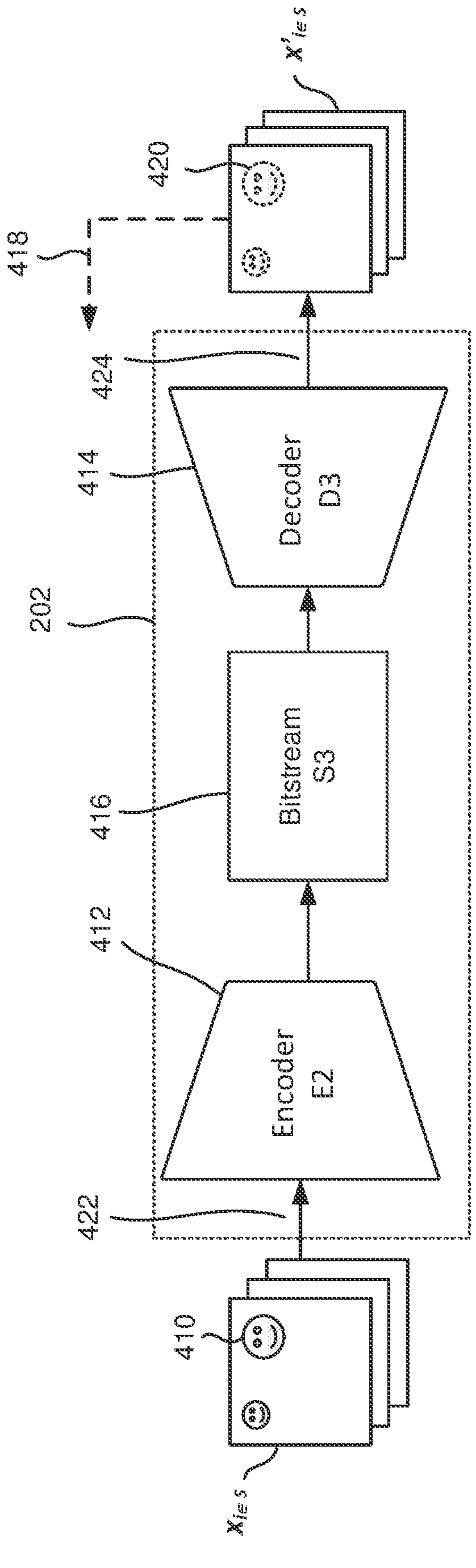
FIG. 4 illustrates a process of training a pair of encoder and decoder, in accordance with an embodiment.

As described in more detail in conjunction with FIG. 4, during the training process, the cloud service system 130 may generate an architecture for a filter subject to one or more bitstream compatibility attributes, node compatibility attributes, and functionality attributes for the filter. For example, the cloud service system 130 may generate an architecture for a filter (e.g., layers of nodes for a neural network model) that complies with the hardware configurations of the node ID's associated with the filter. The input layer of the filter may be structured to receive input stream types of specified input stream ID's and the output layer of the filter may be structured to generate output stream types of specified output bitstream ID's for the filter. Further, the cloud service system 130 may obtain training data that corresponds to the type of information represented by the input stream ID's. Depending on the functionality attributes, the training data may include content such as video, image, audio, text, and a corresponding version of the content for which the desired functionality has been already performed. The training data can be used to train the parameters of the encoder filter and the decoder filter to perform the functionality attribute associated with the filters.

Continuing with the discussion of the cloud service system 130, in a deployment process, the cloud service system 130 may determine and select filters based on requests received from client devices 110. In one embodiment, the cloud service system 130 may obtain information from the request, the information including types of bitstreams (e.g., a bitstream ID) to be processed, information for the node for installation, and desired functionalities for the filter. Based on the type of information associated with input stream and output stream, the cloud service system 130 may identify one or more filters in the filter repository 140 that have bitstream compatibility attributes, node compatibility attributes, or functionality attributes that comply with the requirements specified in the request. For example, the request from a client device of a user of a particular video streaming website may request a decoder filter for decoding bitstream types transmitted from the video streaming website using a particular encoder filter. Responsive to the request, the cloud service system 130 may identify one or more decoder filters associated with bitstream compatibility attributes that indicate the decoder filter can process bitstreams generated by the particular encoder filter. Based on the type of input stream to be processed and the type of desired output stream to be generated, as specified in the received request, the cloud service system 130 may select a filter that is available in the filter repository 140 and send the selected filter to client device 110 for installation on a node.

Continuing with FIG. 1, the client device 110A (sender client) is an online system or device that may transmit encoded content to one or more client devices (receiver) 110B. For example, the sender client 110A may be an image or video sharing website that transmits images and videos responsive to receiving requests from one or more receiver clients 110B. The sender client 110A may receive encoding components from the cloud service system 130 such as the machine-learned encoder filter and may use the filters to encode content for transmission to the receiver client 110B. In one embodiment, the sender client 110A may send a request to the cloud service system 130 to request an encoder filter to encode an input stream for transmission to the receiver client 110B. The input streams and output bitstreams may be associated with bitstream ID's that identify the specific type of bitstream.

In one embodiment, the sender client 110A may specify information in the request to the cloud service system 130, the information including one or more of the an input bitstream type (e.g. input bitstream ID), an output bitstream type (e.g. output bitstream ID), hardware configurations associated with the node for installation (e.g. node ID), and a desired functionality to achieve (e.g. higher resolution or object detection). The cloud service system 130 may select a filter based on the information associated with the request and send the filter to the sender client 110A for installation. The sender client 110A may deploy the encoder filter on the input stream and generates output streams for transmission to the receiver client 110B.

The client device 110B (receiver client) is an online system that receives compressed code from the sender client 110B and reconstructs the original content or variations of the original content using decoding filters received from the cloud service system 130. For example, the receiver client 110B may be a client device for a user of an image sharing website that requests to download one or more images of the website. The receiver client 110B may receive the bitstream generated by the sender client 110A, and send a request including information to the cloud service system 130. Similarly to the requests sent by the sender client 110A, the request may include information such as one or more of an input stream type (e.g. input bitstream ID), an output bitstream type (e.g. output bitstream ID), hardware configurations associated with the node for installation (e.g. node ID), and a desired functionality to achieve (e.g. higher resolution or object detection). The cloud service system 130 may select a filter based on the information associated with the request and send the filter to the receiver client 110B for installation. The receiver client 110B may use the decoding filters to generate a reconstructed version of the original content or generate a variation of the original content based on the desired effect (e.g. functionality) to achieve the specified functionality in the request.

The encoder and decoder filters stored in the filter repository 140 are software-based filters, which are different from traditional encoders or decoders that are hard-coded in hardware specification on user devices. Depending on the architecture of the filters, different hardware platforms or components may be used for the deployment process to facilitate the encoding and decoding process. For example, when the filters are machine-learned filters, the machine-learned filters make it possible for the deployment process of the encoder/decoder filters to be processed by hardware accelerators for neural networks that may already be installed on devices such as computers, cameras, and phones. Although different neural network architectures may be implemented by different algorithms, the different algorithms may include similar computing blocks such as matrix multiplications. As a result, the different neural network algorithms may be computed by common hardware accelerators that are available on endpoint devices and the endpoint users may be exposed to more flexible and versatile options to decode the received content. The system 100 described in conjunction with FIG. 1 may, for example, enable an end user to easily request and update different types of decoder filters depending on the type of content to be transmitted as well as desired functionalities (e.g., blurring of sensitive information, upsampling, viewpoint-specific translation) by the user that conventional encoder-decoders may not be configured to perform for a given hardware device.

FIG. 2 illustrates an exemplary data structure of the file repository 140 that stores various attributes associated with each filter. The data structure illustrated in FIG. 2 is for illustration purposes, while the file repository 140 may include additional information or may be constructed in a different data structure. In the example shown in FIG. 2, each filter is uniquely identified by a filter identifier ("filter ID"). In the exemplary data structure illustrated in FIG. 2, the filter repository 140 stores a plurality of filters that each may include a neural network component with a set of parameters, and information associated with each filter. The exemplary data structure in FIG. 2 includes the filter ID, input and output bitstream compatibility attributes, node compatibility attributes, and functionality attributes for each filter.

For example, based on the bitstream compatibility attributes, the encoder filter with filter ID E2 is configured to receive input stream types with bitstream ID 12, according to the compatibility information. Encoder filter E2 is also configured to generate output bitstream type S3, which may be a specific type of compressed code particular to the encoder filter E2. Based on the node compatibility attributes, encoder filter E2 can be installed on nodes with node ID "Node 2." Decoder filter D3 is a compatible filter with encoder filter E2 that takes as input stream type of S3 as input. Specifically, decoder filter D3 and encoder filter E2 are a pair of compatible filters that are trained together to serve a functionality, which, for example, may be translating an audio or translating texts, as specified in the functionality attribute for both filters. Decoder D3 generates output bitstream type O3, which may be the translated audio or texts. For example, encoder filter E2 may be configured to receive an input stream including English text, and output compressed code for the text that can be transmitted as an output stream. The decoder filter D3 may then receive the transmitted bitstream as input and generate an output stream that represents a translated version of the English text into German.

The exemplary data structure in FIG. 2 is merely an example, and it is appreciated that in other embodiments, the filters and the various attributes associated with the filters can be represented in other ways. Following are additional examples of functionalities that the filters may perform.

Super-resolution: An encoder filter with a super-resolution functionality attribute may take a low-resolution content as an input stream, output an output stream for the low-resolution content. A compatible decoder filter may receive the output stream from the encoder filter and output a high-resolution version of the content.

Temporal Super-resolution: An encoder filter with a temporal super-resolution functionality attribute may take a video content with a certain frame rate as an input stream, and generate an output stream for the video content. A compatible decoder filter may receive the output stream from the encoder filter and output a version of the video with a frame rate that is higher than the original frame rate.

Content Detection: An encoder filter with a content detection functionality attribute may take an image or a video as an input stream, and generate an output stream for the image or video. A compatible decoder filter may receive the output stream from the encoder filter and output content detected in the images/videos, where a content may be concrete objects such as human beings, cars, trees, and the like, or a content may be an action or a scene in the image/video. The outputted content may include annotations for the detected content.

Semantic Content Detection: An encoder filter with a semantic content detection functionality attribute may take a piece of raw media as an input stream, and generate an output stream for the media. A compatible decoder filter may receive the output stream from the encoder filter and output a list of semantic contents detected in the media, where semantic contents may be certain actions or gestures that may be interpreted with a conventional meaning, such as a hand-shake or certain abnormal activities detected in a security camera.

Guided Super-resolution: An encoder filter with a guided super-resolution functionality attribute may take a piece of high-resolution media and a piece of low-resolution media as an input stream, and generate an output stream for the input and encodes the differences between the two pieces of media into an output bitstream. A compatible decoder filter may receive the output stream from the encoder filter and use the bitstream as a guide to generate and reconstruct a high-resolution media from the low-resolution media.

Stylization: An encoder filter with a stylization functionality attribute may take an image/video/text as an input stream, and generate an output stream for the input. A compatible decoder filter may receive the output stream from the encoder filter and stylize the input with a specific style as specified.

Anonymization: An encoder filter with an anonymization functionality attribute may take an image/video/text as an input stream, and generate an output stream for the input. A compatible decoder filter may receive the output stream from the encoder filter and detect sensitive parts of the input, and output a version of the content that blurs or anonymize the sensitive parts, such as blurring faces of the people in the media content or obscuring certain objects.

Enhancement: An encoder filter with an enhancement functionality attribute may take image/video/text as an input stream, and generate an output stream for the input. A compatible decoder filter may receive the output stream from the encoder filter and perform one or more types of enhancements to the input content. Examples of enhancements include but are not limited to color enhancement, noise reduction, night vision enhancement, jitter-removal, etc.

Joint Multi-View Compression: An encoder filter with a joint multi-view compression functionality attribute takes multiple images/videos as input streams and generates one or more output streams for the multiple images/videos. A compatible decoder filter may receive the one or more output streams from the encoder filter and generates an unbroken image/video that is merged from the multiple pieces of original content based on overlapping areas of the images/videos.

Viewpoint Specific Compression: An encoder filter with a viewpoint specific compression functionality attribute may take a video stream as an input stream, and generate an output stream for the video stream. A compatible decoder filter may receive the output stream from the encoder filter and reconstruct the video content from a particular point of view that is different from the original video stream.

Audio Translation: An encoder filter with an audio translation functionality attribute may take an audio stream in a first language as an input stream, and generate an output stream for the audio stream. A compatible decoder filter may receive the output stream from the encoder filter and may output translated text stream in another language.

Parental Control: An encoder filter with a parent control functionality attribute may take an image/video as an input stream and generate an output stream for the image/video. A compatible decoder filter may receive the output stream from the encoder filter and blurs certain frames or objects in the content.

In one embodiment, the filter repository 140 may further include information associated with the machine learning model that trains each respective filter. Specifically, the filter repository may store trained parameters associated with each filter and may further store information associated with architecture of the machine learning model, such as a type of the model and hyper parameters associated with the model. When the cloud service system 130 requests a specific filter by identifying a filter ID, the filter repository 140 may return the trained parameters and other information associated with the filter and the model to the cloud service system 130.

Figure 3:
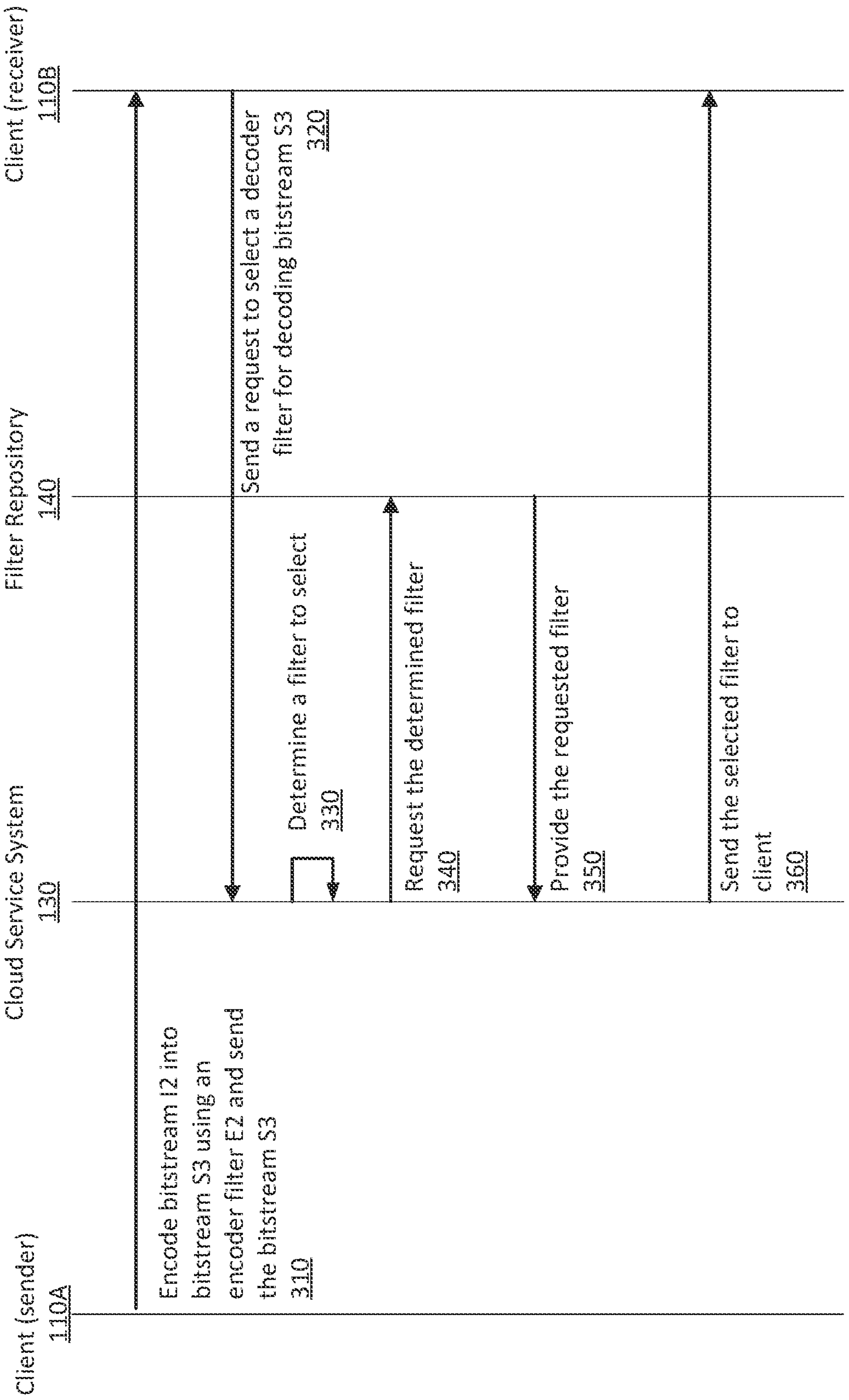
FIG. 3 illustrates a general process for requesting a filter for installation on a client device, in accordance with an embodiment.

FIG. 3 illustrates a general process for requesting a filter for installation on a client device, in accordance with an embodiment. In the example process illustrated in FIG. 3, sender client 110A may send 310 or attempt to send a bitstream with bitstream identifier S3 to a receiver client 110B. The bitstream may be an output generated by an encoder filter E1 where the encoder filter E1 may be received from the filter repository 140 and was installed to the sender client 110A previously. The receiver client 110B, responsive to receiving the transmitted bitstream, may send 320 a request to cloud service system 130 to select a decoder filter for decoding bitstream Si. For example, the receiver client 110B may not have an appropriate decoder filter to decode the transmitted bitstream or may request a decoder filter with a desired functionality attribute specified by the user. The request may specify the type of bitstream, node for installation, or desired functionalities for the decoder filter. The cloud service system 130 may determine 330, based on information associated with the request, a decoder filter to send to the receiver client 110B for decoding the bitstream. For example, the cloud service system 130 may select a filter associated with bitstream compatibility attributes, node compatibility attributes, or functionality attributes that satisfy the requirements in the request. In another embodiment, the receiver client 110B may request a filter for installation on behalf of another node and the request may include information such as hardware configuration associated with the other node. The cloud service system 130 may request 340 the determined filter by accessing the filter repository 140. The filter repository 140 may then provide 350 the requested filter to cloud service system 130. The cloud service system 130 may then send 360 the filter to receiver client 110B for installation on the respective node.

FIG. 4 illustrates a training process that trains a pair of encoder filter E2 and decoder filter D3 in conjunction with one another. Specifically, when the filters are configured as machine-learned filters, the cloud service system 130 may train the filters responsive to a request from, for example, an encoding entity. The request to train may specify input and output bitstream types, node types, or functionalities that the trained filters should be compatible with. The training process may be performed on training data (such as tensors derived from training contents) by iteratively updating parameters associated with each encode and decoder. The training process may involve multiple iterations where each iteration may include a forward pass step and a backpropagation step. A forward pass may refer to information flow in a forward direction (e.g. from input to output) by calculating an output using activation functions that produce activation values as an output representing either the output of the model or used by subsequent portions of the model. In one embodiment, the activation functions may be a weighted sum of values calculated based on parameters associated with each encoder and decoder. In the training process, the output of the model is evaluated with an error function (may also be termed as a loss function) describing the difference between the model output and the desired output of the model. A backpropagation step propagates error information backwards through layers of the model so that the parameters of each encoder and decoder are modified to reduce the expected error. The training process may iteratively perform a forward pass step and backpropagation step until a predetermined criteria is met, such as the expected error or difference of the expected error between consecutive iterations converges to a value below a pre-determined threshold.

In the example illustrated in FIG. 4, the cloud service system 130 trains the pair of encoder 412 and decoder 414 using a set of training content $x_{i \in S}$ from a training set S to reduce a loss function. For example, the pair of encoder 412 and decoder 414 may be trained to perform a desired functionality for translation where the encoder filter 412 takes an audio as input and the decoder filter 414 outputs translated text (e.g. input audio in Germany and output text in English). The cloud service system 130 generates an architecture for the machine-learned filters that each include one or more neural network layers. Specifically, depending on the specifications for the node types that the filter is to be installed on, the cloud service system 130 may initialize the architecture such that it complies with memory or processing power requirements for the node. For example, the node for installation may be a camera with limited memory storage and therefore the number of layers in the model 202 may be taken into consideration such that the size of the model can fit with in the limited memory size.

Depending on the desired functionality for the encoder filter 412 and the decoder filter 414, the training content includes multiple instances of original contents and desired versions of the original contents that are known versions of the original contents to which the desired functionality is applied to. For example, in FIG. 4, the input training data 410 may be audio data in German and the desired versions of the original contents may be corresponding texts in English. Moreover, depending on the bitstream types for the encoder filter 412 and the decoder filter 414, the cloud service system 130 may encode the training data in an appropriate format that complies with the specified bitstream types for the machine-learned filters, and structure the encoder filter 412 and the decoder filter 414 to receive input streams and generate output streams for the bitstream types. For example, the cloud service system 130 may encode the audio data with respect to waveforms and spectra consistent with the bitstream type of the input stream to the encoder filter 412. The cloud service system 130 may also encode the desired versions of the training data using one-hot encoding for words and phrases of the English text. Outputs 420 generated from the model are compared with output training data which represent ground truth for an expected output of the model. In one embodiment, the difference is determined by a loss function which calculates a reconstruction loss that represents difference between the estimated versions of the training content and the desired versions of the training content.

Specifically, the cloud service system 130 applies the encoder filter 412 to the training data 410 to generate output bitstream 416. The training data 410 is encoded to an input stream 422 based on an input stream type for the encoder filter 412 specified in the training request. The outputted bitstream may then become the input of decoder filter 414 and is passed through the decoder filter 414. The output 420 generated from the decoder filter 414 may be the output for the respective iteration represented by an output bitstream. The output 420 may be generated from an output stream 424 that is an encoded representation based on an output bitstream type for the decoder filter 414 specified in the training request.

The cloud service system 130 computes an error term 418 based on a loss function. The loss function represents a difference between the output 420 and desired versions of the original content in the training data. The error term 418 may be backpropagated through the model to update parameters of the encoder filter 412 and the decoder filter 414. With the parameters updated based on the error term 418, training content 410 may be iteratively passed through the model until the error term calculated from the loss function meets a pre-determine criteria. For example, the training process may be terminated responsive to the error term falling below a pre-determined threshold or the difference in error terms between iterations falling below a pre-determined threshold. Specifically, the training process may be terminated when additional iterations may not significantly improve the model results (e.g. the process may also be referred to as convergence).

When the training process is complete, the cloud service system 130 may assign the trained filters a filter ID (e.g. E2, D3). The cloud service system 130 may also assign bitstream ID's to the input and output streams of the encoder and decoder filter, and for each filter, generate the respective bitstream compatibility attribute based on the assigned bitstream ID's, the node compatibility attribute based on the compatible node types, and the functionality attribute based on the desired functionality the filters were trained for. The cloud service system 130 stores the trained filters including trained parameters and model information (e.g. model type, model architecture, model attributes, hyper parameters) in the filter repository 140.

While the training process in FIG. 4 illustrates one encoder filter and one decoder filter, it is appreciated that multiple encoder filters and multiple decoder filters can be trained in conjunction with each other, such that the output streams generated by any one encoder filter is compatible as input streams to any one decoder filter that is trained in conjunction with each other. For example, the cloud service system 130 may train an encoder-to-multiple decoder architecture in which one encoder filter is trained in conjunction with multiple decoder filters, where the output stream of the encoder filter is input to each of the multiple decoder filters. For example, an encoder filter can produce an output stream from an input video that a first decoder filter can use to reconstruct the video, while a second decoder filter can use to generate descriptive metadata about the input video. As another example, both a first decoder filter and a second decoder filter can be configured to reconstruct the input video, but each may be optimized to run on different hardware platforms. As another example, the cloud service system 130 may train a multiple-encoder-to-decoder architecture in which multiple encoder filters are trained in conjunction with a single decoder filter, where the output streams of the encoder filters are input to the decoder filter. In such an instance, the decoder filter may have a bitstream compatibility attribute that specifies multiple bitstream ID's each corresponding to the output stream type of a respective encoder filter.

Figure 5:
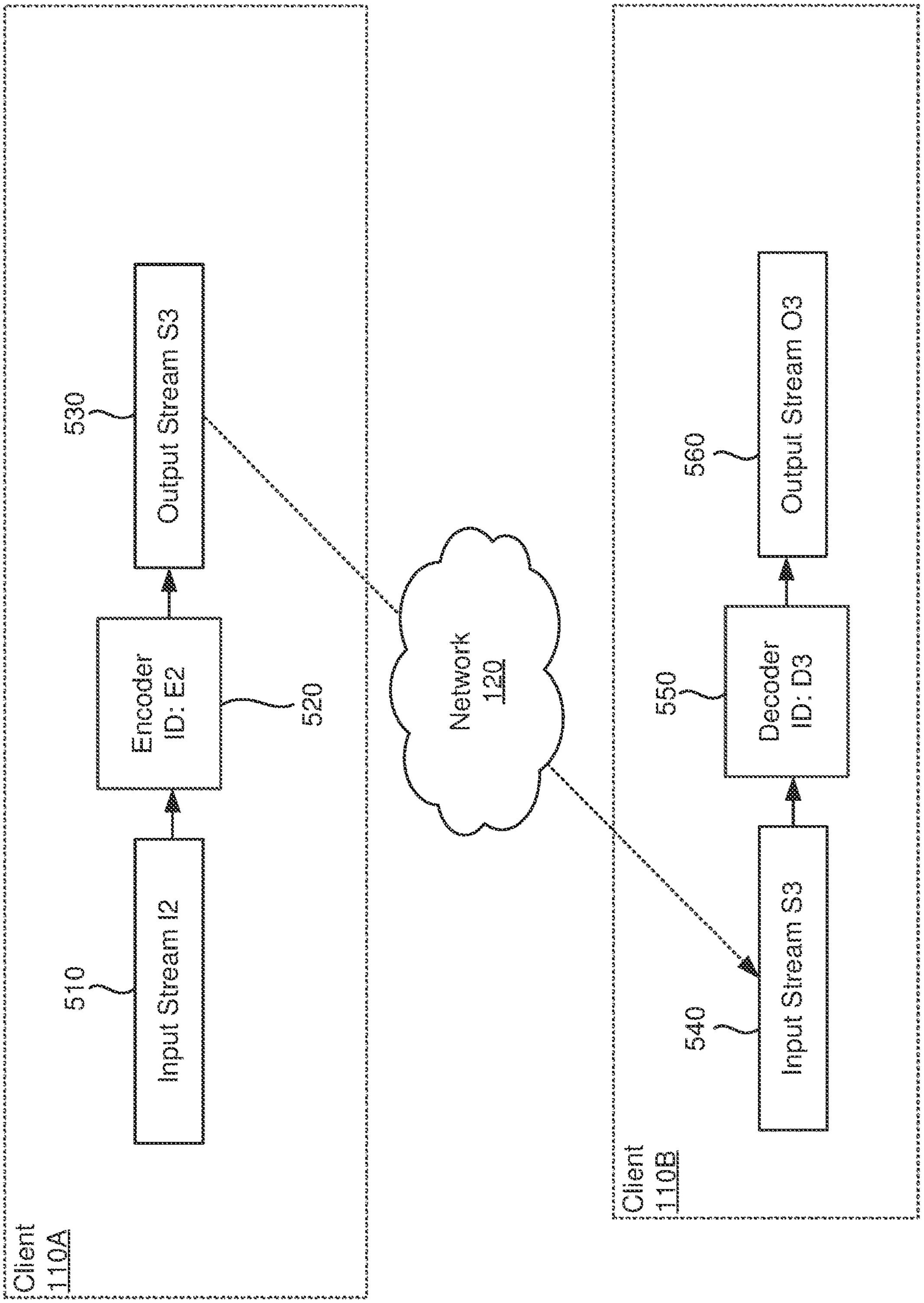
FIG. 5 illustrates a deployment process for a pair of encoder and decoder, in accordance with an embodiment.

FIG. 5 illustrates a general deployment process for applying an encoder filter 520 and a decoder filter 550 during a content transmission process, in accordance with an embodiment. The sender client 110A may send a request to the cloud service system 130 to request a trained encoder filter 520 to encode an input stream 510 for transmission to the receiver client 110B. The cloud service system 130 may select the encoder filter 520 based on information provided in the request such as the types of bitstreams to be processed, hardware configurations associated with the node for installation of the filter, and desired functionality that client 110 may wish to achieve. The cloud service system 130 may determine the encoder filter 520, retrieve the encoder filter 520 from the filter repository 140, and send the encoder filter 520 to the respective node (e.g. client 110A) for installation. Specifically, the sender client 110A may generate a compressed bitstream 530 of bitstream ID S3 by applying the encoder filter 520 to the input stream 510 of bitstream ID 12. The sender client 110A may then transmit the compressed output bitstream 530 to the receiver client 110B through network 120.

The receiver client 110B may receive the bitstream 540 of bitstream ID S3 as an input stream and send a request to the cloud service system 130 for a decoding filter to decode the compressed bitstream 540 and that complies with the node type of the receiver client 110B, as well as the functionality desired by the user of the receiver client 110B. The cloud service system 130 may select a filter based on information included in the request and select a decoder filter 550 stored in the filter repository 140 associated with the appropriate compatibility attributes. The cloud service system 130 sends the selected decoder filter to the receiver client 110B. The receiver client 110B may then apply the received decoder filter 550 to synthesize the reconstructed content from the compressed bitstream 540. Specifically, the receiver client 110B generates an output stream of bitstream ID O3 to generate a reconstructed version of the original content by applying the decoder filter 550 to the input stream 540 of bitstream ID S3.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An encoding method, comprising:

requesting, by a coding node from a remote repository, a coding filter, the request identifying a bitstream attribute and an attribute of the computing node;

receiving, at the coding node from the repository, the requested coding filter selected by the repository in response to the bitstream attribute and the node attribute, the coding filter having been trained in conjunction with a corresponding decoder filter based on training data;

coding, by the coding node, source data according to the requested coding filter, the coding producing coded source data having an output bitstream type corresponding to the bitstream attribute; and providing the coded source data and an indication of the output data type to a channel.

2. The encoding method of claim 1, wherein the coding filter is configured to produce the coded source data by applying a set of trained parameters to the source data.

3. The encoding method of claim 1, wherein the coding filter is associated with a node compatibility attribute that identifies a respective subset of node types having hardware specifications compatible with the coding filter.

4. The encoding method of claim 3, wherein the coding filter is compatible for installation on a plurality of node types each identified with a node identifier (node ID), and the node compatibility attribute for the coding filter is the node identifier for the respective subset of node types that are compatible with the coding filter.

5. The encoding method of claim 1, wherein the output bitstream type is identified with a bitstream identifier (bitstream ID), and the bitstream attribute for the coding filter is the bitstream identifier correspond to a respective subset of bitstream types that are compatible with the coding filter.

6. The encoding method of claim 1, wherein the coding filter is trained in conjunction with at least one decoder filter, and wherein the coded source data produced by the coding filter is a bitstream type that is compatible as an input stream to the at least one decoder filter.

7. The encoding method of claim 6, wherein the coding filter and the decoder filter are each configured as a deep neural network.

8. The encoding method of claim 1, wherein:

the request further specifies a functionality attribute that indicates an operation the coding filter is configured to perform on information included in an input stream to the filter; and the coding filter is further associated with the functionality attribute.

9. The encoding method of claim 8, wherein the source data includes video content, and the operation is one or more modifications to image frames of the video content.

10. A non-transitory computer-readable storage medium storing executable computer instructions that, when executed by one or more processors, cause the one or more processors to perform steps comprising:

requesting, by a coding node from a remote repository, a coding filter, the request identifying a bitstream attribute and an attribute of the node;

receiving, at the coding node from the repository, a coding filter selected by the repository in response to the bitstream attribute and the node attribute, the coding filter having been trained in conjunction with a corresponding decoder filter based on training data;

coding, by the coding node, source data according to the requested coding filter, the coding producing coded source data having an output bitstream type corresponding to the bitstream attribute; and providing the coded source data and an indication of the output data type to a channel.

11. A system for encoding a set of source frames, comprising:

a processor; and a memory storing instructions for execution on the processor, the instruction including:

requesting, by a coding node from a remote repository, a coding filter, the request identifying a bitstream attribute and an attribute of the node;

receiving, at the coding node from the repository, a coding filter selected by the repository in response to the bitstream attribute and the node attribute, the coding filter having been trained in conjunction with a corresponding decoder filter based on training data;

coding, by the coding node, source data according to the requested coding filter, the coding producing coded source data having an output bitstream type corresponding to the bitstream attribute; and providing the coded source data and an indication of the output data type to a channel.

12. A decoding method, comprising:

responsive to receipt of an indication of a bitstream attribute, the bitstream attribute associated with coded source data produced by a coding filter of an encoder, requesting, by a decoding node from a remote repository, a decoding filter, the request identifying the bitstream attribute and a node attribute of the decoding node;

receiving, at the decoding node from the repository, a decoding filter selected by the repository in response to the bitstream attribute and the node attribute, the decoding filter having been trained in conjunction with the coding filter based on training data;

decoding, by the decoding node, the coded source data received from a channel and according to the requested decoding filter; and outputting decoded source data.

13. The decoding method of claim 12, wherein the decoding filter is configured to apply a set of trained parameters to the coded source data.

14. The decoding method of claim 12, wherein the decoding filter is associated with a node compatibility attribute that identifies a respective subset of node types having hardware specifications compatible with the decoding filter.

15. The decoding method of claim 14, wherein the decoding filter is compatible for installation on a plurality of node types each identified with a node identifier (node ID), and the node compatibility attribute for the decoding filter is the node identifier for the respective subset of node types that are compatible with the decoding filter.

16. The decoding method of claim 12, wherein an output bitstream type is identified with a bitstream identifier (bitstream ID), and the bitstream attribute for the decoding filter is the bitstream identifier correspond to a respective subset of bitstream types that are compatible with the decoding filter.

17. The decoding method of claim 12, wherein the decoding filter is trained in conjunction with at least one encoder filter, and wherein the coded source data produced by the coding filter is a bitstream type that is compatible as an input stream to the at least one decoding filter.

18. The decoding method of claim 17, wherein the coding filter and the decoder filter are each configured as a deep neural network.

19. The decoding method of claim 12, wherein:

the request further specifies a functionality attribute that indicates an operation the decoding filter is configured to perform on information included in an input stream to the filter; and the decoding filter is further associated with the functionality attribute.

20. The decoding method of claim 19, wherein the source data includes video content, and the operation is one or more modifications to image frames of the video content.

21. A non-transitory computer-readable storage medium storing executable computer instructions that, when executed by one or more processors of a decoding node, cause the one or more processors to perform steps comprising:

responsive to receipt of an indication of a bitstream attribute, the bitstream attribute associated with coded source data produced by a coding filter of an encoder, requesting, by the decoding node from a repository, a decoding filter, the request identifying the bitstream attribute and a node attribute of the decoding node;

receiving, at the decoding node from the repository, a decoding filter selected by the repository in response to the bitstream attribute and the node attribute, the decoding filter having been trained in conjunction with the coding filter based on training data;

decoding, by the decoding node, the coded source data received from a channel and according to the requested decoding filter; and outputting decoded source data.

22. A system for decoding a set of coded source frames, comprising:

a processor; and a memory storing instructions for execution on the processor, the instruction including:

responsive to receipt of an indication of a bitstream attribute, the bitstream attribute associated with coded source data produced by a coding filter of an encoder, requesting, by the processor from a remote repository, a decoding filter, the request identifying the bitstream attribute and a node attribute of the decoding node;

receiving, at the decoding node from the repository, a decoding filter selected in response to the bitstream attribute and the node attribute, the decoding filter having been trained in conjunction with the coding filter based on training data;

decoding, by the decoding node, the coded source frames received from a channel and according to the requested decoding filter; and outputting decoded source data.

* * * * *